(12) United States Patent
Marino et al.

(10) Patent No.: US 7,766,388 B1
(45) Date of Patent: Aug. 3, 2010

(54) MODULAR BASE ASSEMBLY FOR VEHICLE MODEL-MAKING

(76) Inventors: Paul W. Marino, 483 Keelson Dr., Detroit, MI (US) 48215; Jason Piotrowski, 28884 Olde Bridge Cir., Chesterfield Township, MI (US) 48047

( * ) Notice: Subject to any disclaimer, the term of this patent is extended or adjusted under 35 U.S.C. 154(b) by 1093 days.

(21) Appl. No.: 11/334,035

(22) Filed: Jan. 18, 2006

(51) Int. Cl.
*B62D 21/00* (2006.01)
*B62D 24/00* (2006.01)
(52) U.S. Cl. .................. 280/781; 280/785; 280/797
(58) Field of Classification Search .......... 280/781, 280/785, 795, 797, 798
See application file for complete search history.

(56) References Cited

U.S. PATENT DOCUMENTS

| | | | | |
|---|---|---|---|---|
| 4,386,792 A * | 6/1983 | Moore et al. | ............... | 280/781 |
| 4,838,605 A * | 6/1989 | Abromavage | ............ | 296/184.1 |
| 4,881,756 A * | 11/1989 | Kumasaka et al. | .......... | 280/785 |
| 5,725,247 A * | 3/1998 | Nilsson et al. | .............. | 280/781 |
| 6,283,538 B1 * | 9/2001 | Reitnouer | ................. | 296/184.1 |
| 6,681,489 B1 * | 1/2004 | Fleming | ..................... | 29/897.2 |
| 6,742,808 B1 * | 6/2004 | Kosak | ......................... | 280/781 |
| 6,744,615 B1 * | 6/2004 | Melbert et al. | ............. | 361/154 |
| 7,261,322 B2 * | 8/2007 | Ito et al. | ..................... | 280/781 |
| 7,325,866 B2 * | 2/2008 | Horton et al. | ............... | 296/205 |
| 7,350,818 B2 * | 4/2008 | Rini et al. | .................... | 280/781 |
| 7,441,809 B1 * | 10/2008 | Coombs et al. | ............. | 280/785 |

* cited by examiner

*Primary Examiner*—Toan C To
(74) *Attorney, Agent, or Firm*—Young Basile

(57) ABSTRACT

One embodiment of a modular base assembly comprises a frame and leveler assemblies used to support a vehicle model. The frame has a frame segment with several parts including a cross-support and a side-support having a surface defining a plurality of holes where model-making components can be attached and unattached thereto. Leveler assemblies level the base assembly, and each can include a wheel hub locator that adjustably fixes a hub along a longitudinal horizontal, a vertical, and a lateral horizontal direction. Another embodiment comprises a motorized vehicle undercarriage that carries a frame. The frame has a platform with a top surface defining a plurality of holes in the form of a matrix. Model-making components can be attached and unattached thereto.

29 Claims, 6 Drawing Sheets

MODULAR BASE ASSEMBLY FOR VEHICLE MODEL-MAKING

TECHNICAL FIELD

The field of this invention relates generally to making models for vehicles, and more particularly, to a base assembly used in making vehicle models.

BACKGROUND OF THE DISCLOSURE

Model-making is often used in vehicle industries like the automotive industry. In that industry, designers make full-scale automobile models out of a suitable clay to get a general look and feel of their design before the automobile is produced and sold. Designers also make full-scale, life-like models from a suitable foam for showing off future automobile designs at trade shows. In both cases, a base assembly is commonly used as sort of a pedestal for the models. Some base assemblies are made to be steerable and wheel driven like a real automobile, and some are not. Traditionally, steel castings have been used for both these drivable and nondrivable base assemblies.

Although the steel castings have been in use for a long time, they have some drawbacks. For one thing, the castings are often unwieldy. As mentioned, they are sized for a full-scale automobile and made from solid steel; this can make them difficult to handle in the design facility and in shipping. For another thing, the castings can be costly. Besides being cast entirely from steel, each one is usually customized to a particular automobile. For manufacturers, this means that the same casting for a small automobile, like a passenger car, cannot be used for a larger one, like a sport-utility-vehicle. And as a result, manufacturers have to buy a casting for each model.

What is needed is a base assembly that is easier to handle than the traditional one, and what is also needed is a modular base assembly that can be used for modeling more than one size automobile that will thereby reduce costs.

SUMMARY OF THE DISCLOSURE

In accordance with one aspect of the invention, a modular base assembly used in vehicle model-making includes a frame and at least two leveler assemblies. The frame has at least one frame segment. The frame segment in turn has at least one cross-support supporting at least two side-supports. Each side-support has a surface defining a plurality of holes for removably attaching model-making components. The levelers level the base assembly and are removably attached to respective side-supports.

In accordance with another aspect of the invention, a modular base assembly used in vehicle model-making has a motorized vehicle undercarriage that carries a frame. The frame has a platform with a top surface. The top surface partly defines a plurality of holes in the form of a matrix so that model-making components can be removably attached thereto at a selected location.

In accordance with yet another aspect of the invention, a leveler assembly used on a vehicle model-making modular base assembly has a base, a jack assembly, a wheel hub locator, and a hub. The base attaches the leveler assembly to the base assembly. The jack assembly is attached to and levels the base assembly. The wheel hub locator is also attached to the base, and adjustably fixes the hub along a lateral horizontal direction, a vertical direction, and a longitudinal horizontal direction with respect to the base. The hub is constructed to carry a wheel assembly and is attached to the end of the wheel hub locator.

In accordance with another aspect of the invention, a cross-support used in a vehicle model-making modular base assembly has a rectangular body with a first and second end and a center section between the ends. The ends have end flanges constructed to carry a side-support. And the center section has a suitable webbing that gives sufficient strength to the cross-support to help support a vehicle model.

In accordance with yet another aspect of the invention, a pair of stacked side-supports used in a vehicle model-making modular base assembly, each having an extruded rectangular body with a first and second end and four surfaces extending between the ends. The surfaces define holes in the form of a matrix where model-making components can be removably attached. The matrix substantially covers those surfaces.

In accordance with another aspect of the invention, an interior angle bracket used in a vehicle model-making modular base assembly having a triangular body with three sides. Each side has a suitable webbing that gives sufficient strength to the bracket to help support a vehicle model. And each bracket is secured to an inside corner of a frame segment of the base assembly.

BRIEF DESCRIPTION OF THE DRAWINGS

Reference now is made to the accompanying drawings in which.

DETAILED DESCRIPTION OF THE PREFERRED EMBODIMENT

Figure 3:
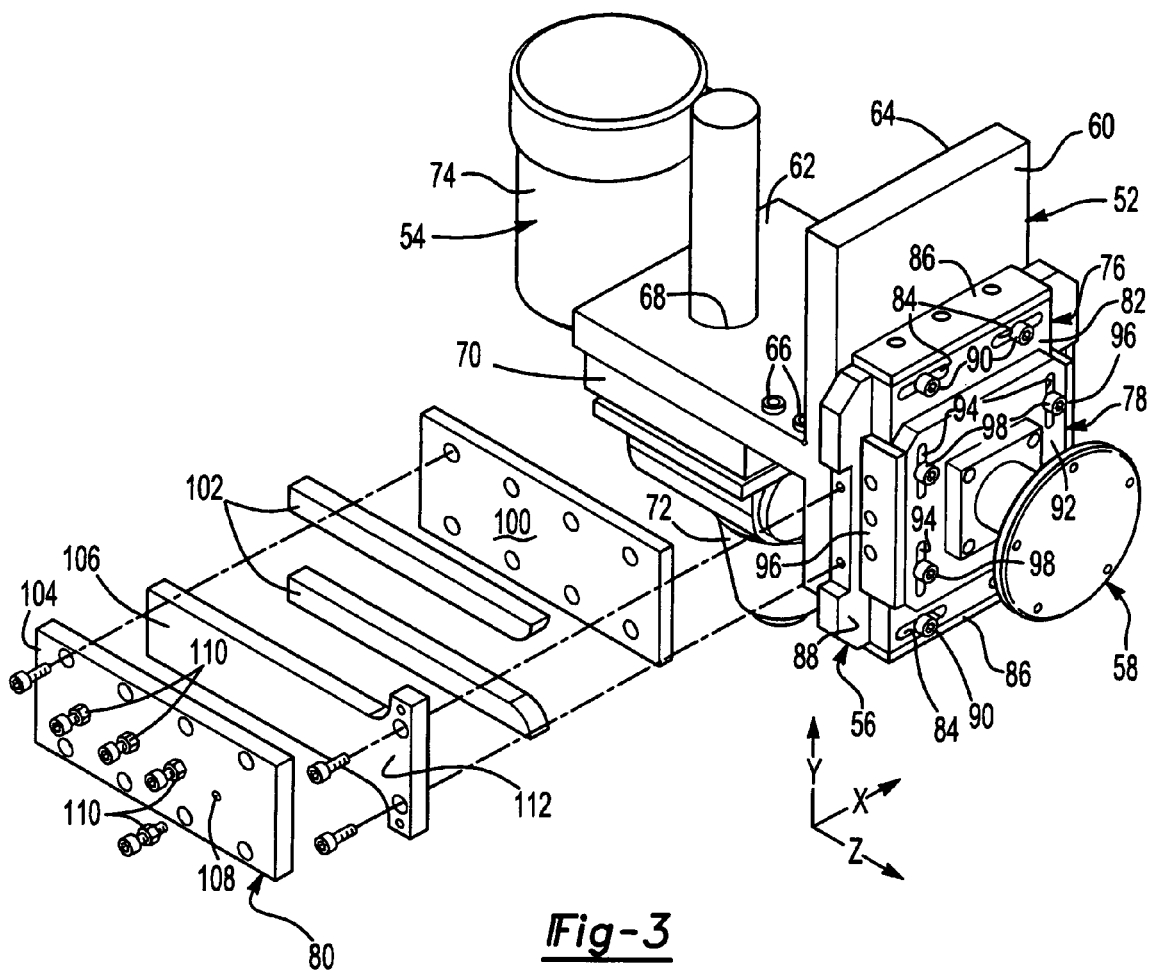
FIG. 3 is a partially exploded view of a leveler assembly of the base assembly of FIG. 1, specifically with a third adjuster exploded to show its parts.
Figure 4:
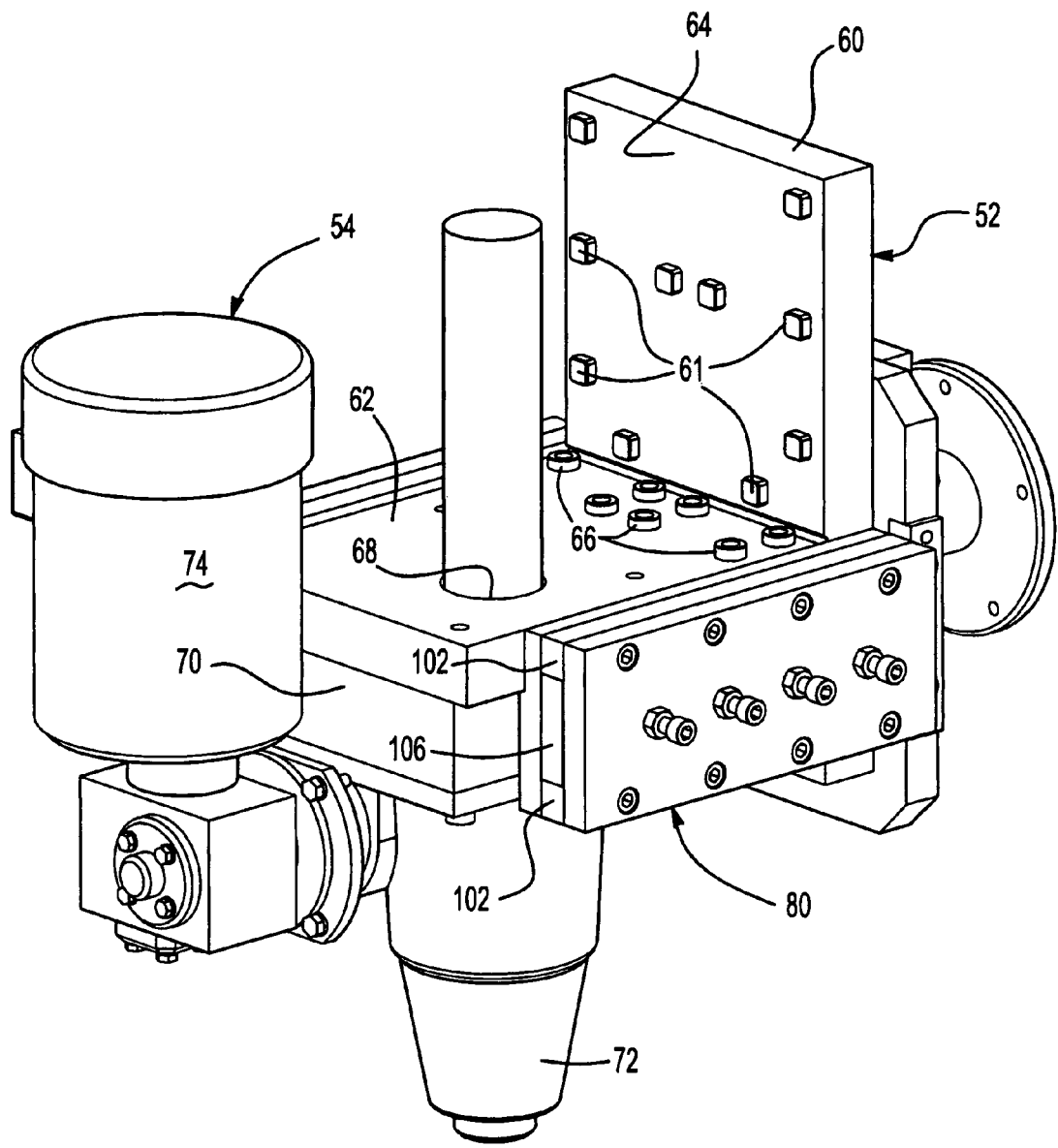
FIG. 4 is another view of the leveler assembly of FIG. 3, specifically showing an arrangement of locating nubs.
Figure 5:
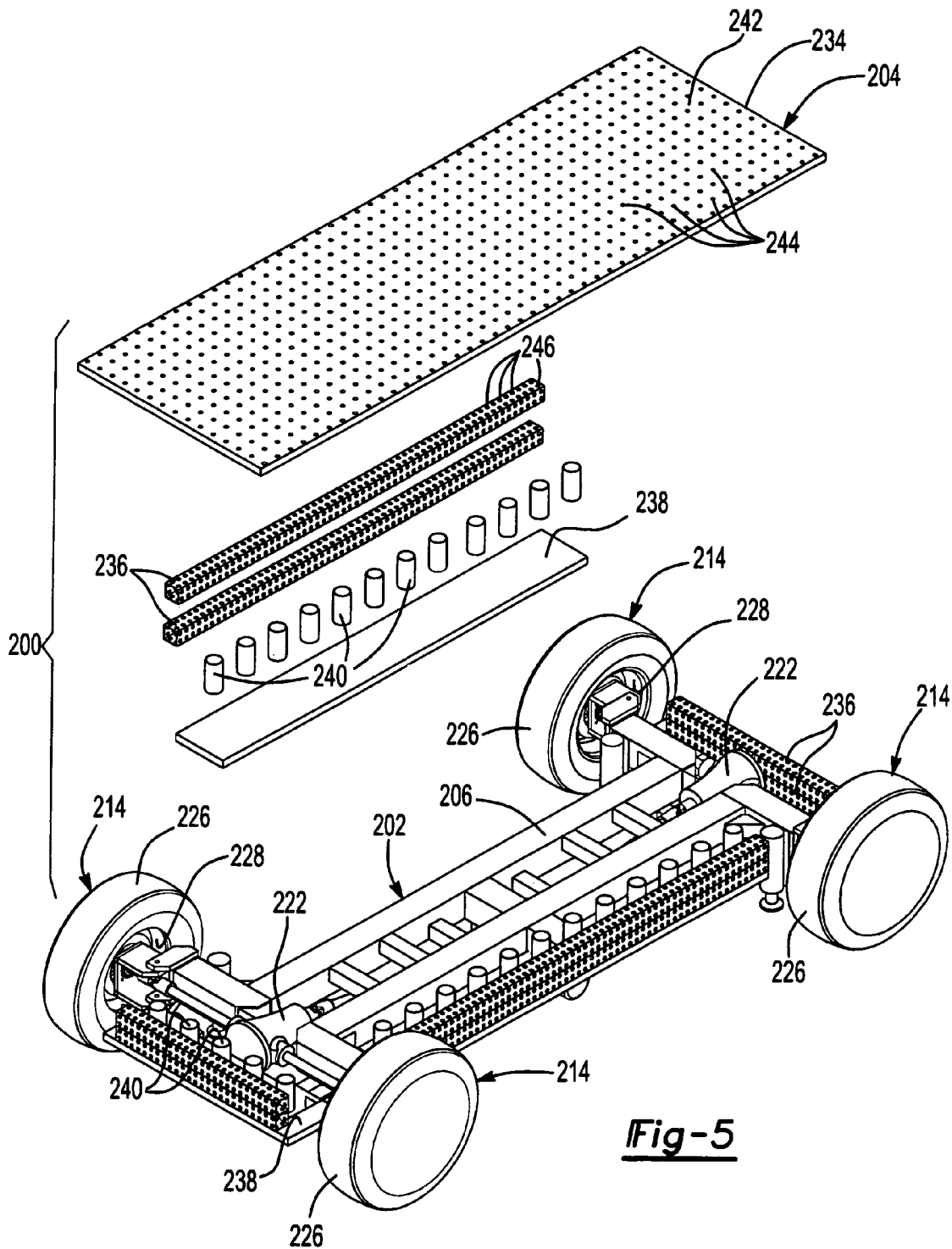
FIG. 5 is a partially exploded view of another embodiment of a base assembly according to the invention, specifically showing a frame and its parts separated from a vehicle undercarriage.
Figure 6:
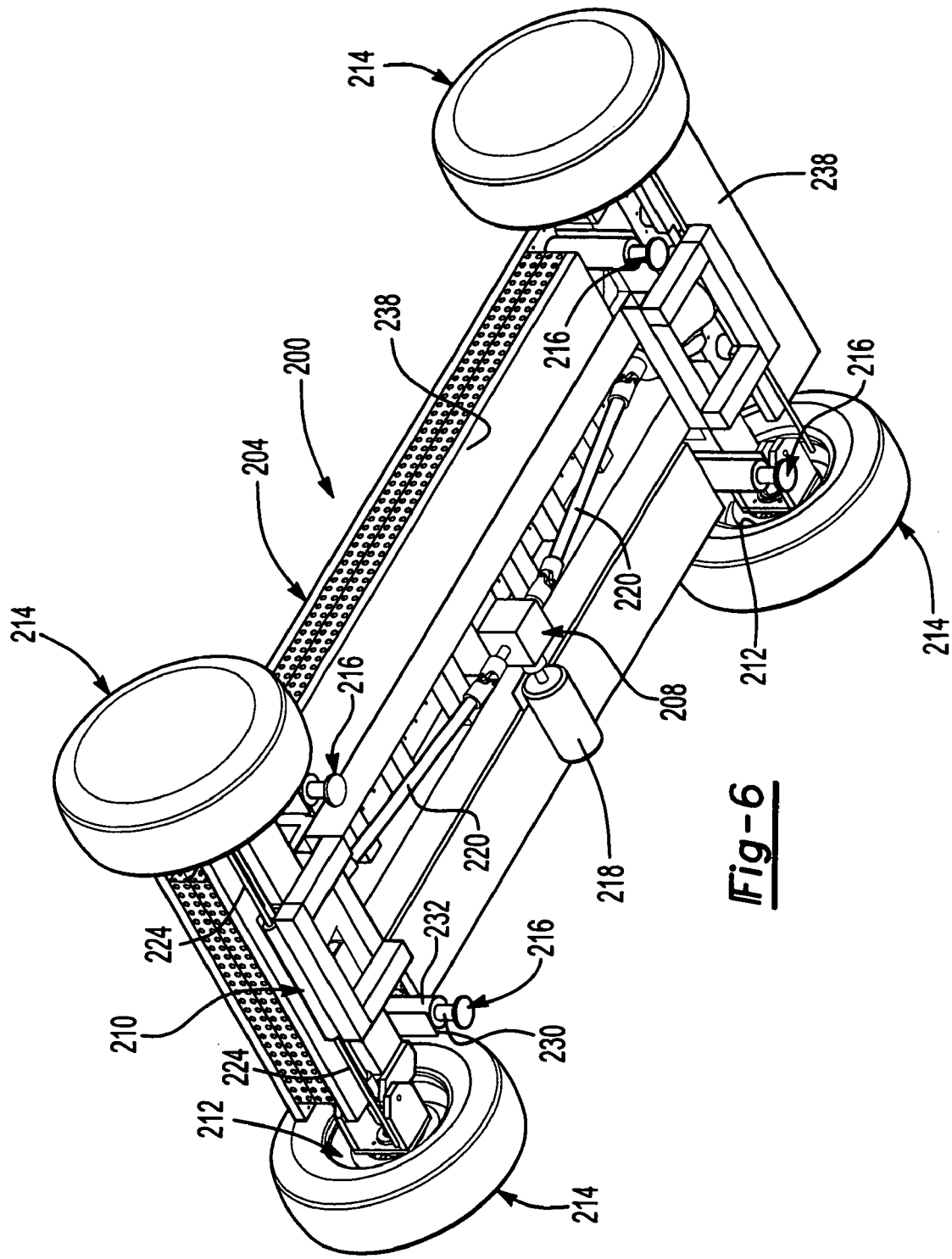
FIG. 6 is a perspective view showing the underside of the base assembly of FIG. 5 when the frame is placed on the undercarriage.

In general, two illustrative embodiments are shown of a modular base assembly for vehicle model-making, one in FIGS. 1-4 and another in FIGS. 5-6. Although the embodiments are specifically described in use with automobiles, the base assemblies' applications are more encompassing to include motor homes, busses, watercraft, aircraft, and the like. As such, the term "vehicle" includes all of these. Also, the term "modular" is used in the sense that the base assemblies have parts designed with standardized dimensions so that a particular base assembly can accommodate modeled vehicles of different sizes. This means that for automobiles, one assembly can be used to model a small passenger car and also used to model a larger sport-utility-vehicle—thereby reducing costs. And these modular parts are more easily assembled and disassembled, and generally made of lightweight materials—thereby making handling easier.

Figure 1:
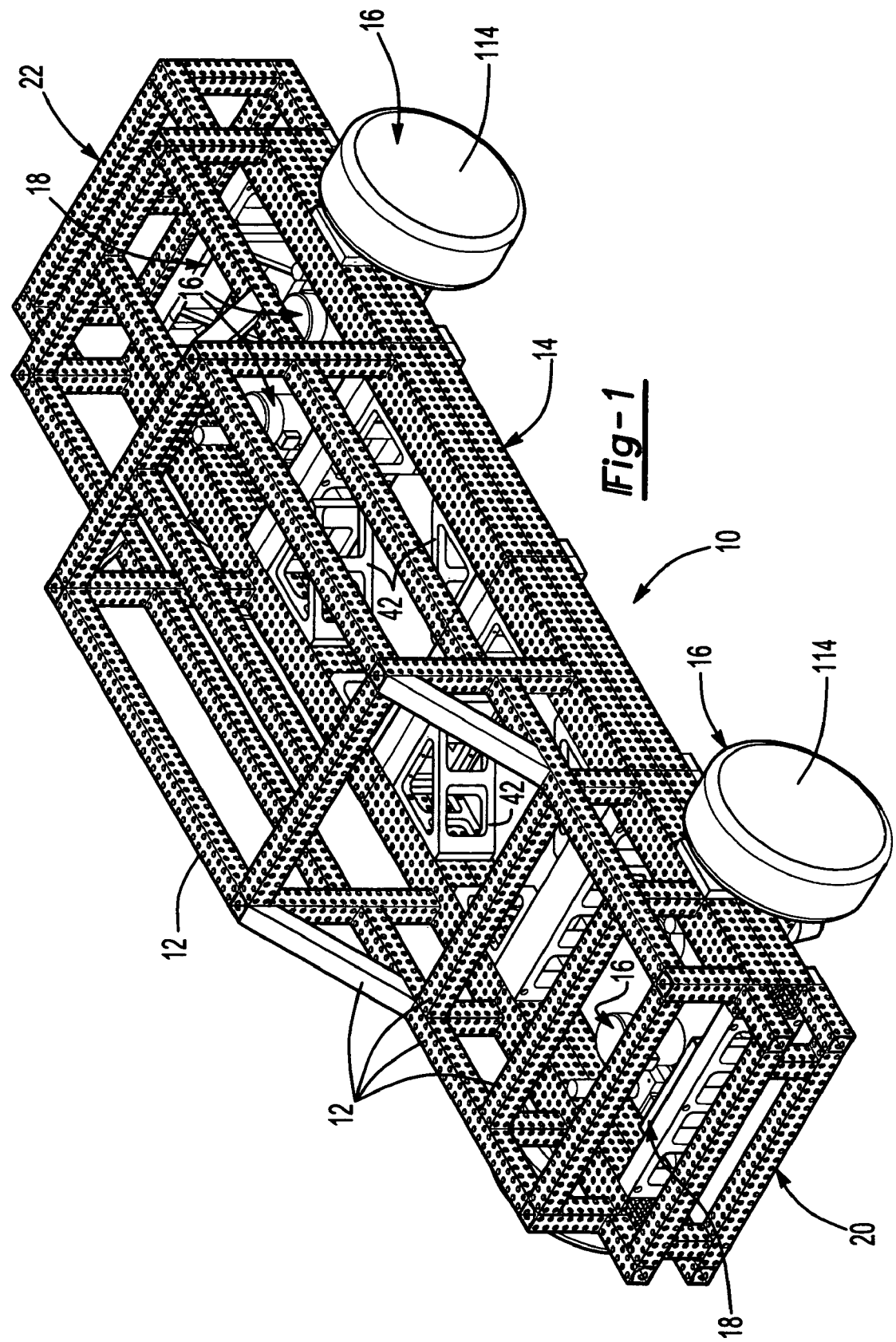
FIG. 1 is a perspective view showing one embodiment of a base assembly having a plurality of model-making components attached thereto to form a skeleton of an automobile configuration according to the invention.

Referring now to FIG. 1, one embodiment of a modular base assembly is shown at 10. Generally it will support automobile models weighing about 3,000-4,000 pounds, and it is made to support up to 10,000 pounds. The base assembly 10 has numerous model-making components 12 attached to it that form the skeleton of an automobile. These components 12 can be configured to skeleton different size automobiles. Base assembly 10 further has a frame 14, four leveler assemblies 16 attached around the frame, a pair of couplers 18 attached on opposite ends of the frame, and a first and second fascia 20, 22 that can also be attached at opposite ends of the frame. Collectively these components compose the modular base assembly 10.

Figure 2:
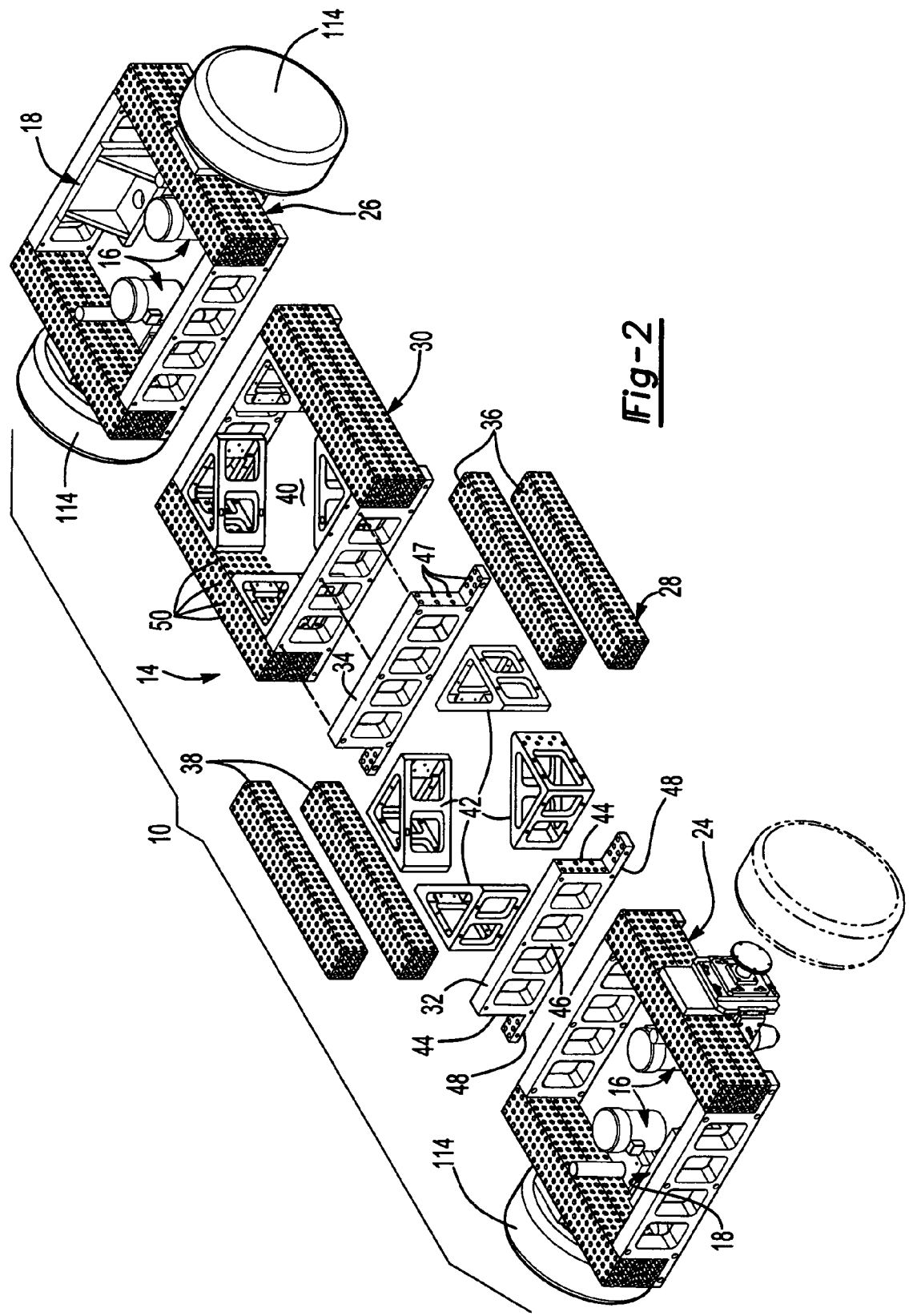
FIG. 2 is an exploded view of a frame showing a front frame segment, an exploded intermediate frame segment, another intermediate frame segment, and a rear frame segment—all being part of the base assembly of FIG. 1.

The frame component 14 serves as the base assembly's main body where the other components, including model-making components, stem from. Frame 14 generally has a rectangular shape. Referring now to FIG. 2, its shape comes from four frame segments that are attached end-to-end—specifically, a front frame segment 24, a rear frame segment 26, and two intermediate frame segments 28, 30 that are all bolted together. The frame segments 24, 26, 28, 30 allow the user to disassemble the base assembly in manageable parts for handling, and by the same token, reassemble it. And so each frame segment 24-30 forms a part of the whole frame 14, thus there could be more or less of them in number, and they could be of various shapes and sizes. Each one is a solid structure capable of supporting an apportioned model weight applied to it. Each frame segment 24-30 generally has a rectangular shape with the same structure. In more detail, referring to exploded intermediate frame segment 28, it is made up of oppositely disposed first and second cross-supports 32, 34 and oppositely disposed first and second pairs of identical side-supports 36, 38 that define an interior space 40 with four interior angle brackets 42 therein.

The first and second cross-supports 32, 34 support the side-supports and define opposite sides of the frame segment's boundary. As shown in FIG. 2, cross-supports 32, 34 are also attached by bolting to other cross-supports of adjacent frame segments. Each cross-support 32, 34 generally has a rectangular body with flat outer surfaces. They are cast from aluminum or any other suitable material and have machined bolt holes 47; some of the bolt holes are used for attaching to adjacent cross-supports while others are used for attaching side-supports 36, 38. First and second cross-supports 32, 34 have outward facing ends 44 with a center section 46 therebetween. The outward facing ends 44 define the before mentioned bolt holes for attaching the side-supports by bolting. Each end has an end flange 48 extending therefrom, and each end flange also defines bolt holes for attaching the side-supports. Put differently, end flanges 48 are attached to the underside of respective side-supports 36, 38, while outward facing ends 44 are attached to the side of respective side-supports 36, 38. Between cross-support ends 44, center section 46 has a suitable webbing that reduces the overall weight of the cross-support but that still gives sufficient strength to the cross-supports and strength to the frame segment for supporting the model. The particular webbing shown has four rectangular apertures. The cross-supports 32, 34 are similar in structure to each other. They may have varying thickness with different numbers of bolt holes 47 therethrough.

The first and second pairs of side-supports 36, 38 support model-making components 12 and keep leveler assemblies 16; the side-supports define the outer sides of the frame segment's boundary. Both the model-making components and the leveler assemblies can be removably attached to the side-supports. As noted, the side-supports are installed in stacked pairs but could be installed as a single part. Even then each side-support part is extruded into a generally rectangular body using aluminum 7075-T6+ hardness, or any other suitable material, to a width of 160 mm, a height of 120 mm, and a length of 1,000 mm. In addition to defining the sides of the frame segment, first and second side-supports 36, 38 run along and define the sides of frame 14. Specifically, the side-supports rest on and are bolted to end flanges 48, and are bolted to ends 44. Each side-support body has four flat surfaces that define a plurality of holes 50 in the form of a matrix. The holes are arranged in such a matrix, a regular array of columns and rows, so that model-making components and leveler assemblies can be attached anywhere therealong. This partly gives base assembly 10 its modularity. Put differently, holes 50 are actually bolt holes suitable for attaching components 12 assemblies 16. Components 12 can be attached and unattached essentially anywhere along holes 50 to thereby create modeled vehicles of different sizes. Likewise, leveler assemblies 16 can be attached and unattached anywhere along holes 50 to thereby vary the length of the wheel base of different modeled vehicles. Holes 50 are machined on all of the side-supports' surfaces. When the front, rear, and intermediate frame segments are attached, the holes generally run continuously along the sides of frame 14. And although shown covering virtually all of side-supports' surfaces, the holes could be arranged in many forms so long as the model-making components and the leveler assemblies can be attached and unattached thereto.

As mentioned, cross-supports, 32, 34 and side-supports 36, 38 define interior space 40 where interior angle brackets 42 are located. The brackets help maintain the structure of the frame segment where it is attached by carrying a portion of the model load. Brackets 42 are cast from aluminum or any other suitable material in a generally triangular asymmetrical shape that complements the inside corners of the frame segments where they are positioned and secured. Brackets 42 have three connecting sides with a suitable webbing in each side to reduce its overall weight while still giving sufficient strength to the bracket. In FIG. 2, the brackets are only shown in intermediate frame segments 28 and 30, but they can be used in any of the frame segments to help maintain those structures. Specifically, each bracket 42 is attached by bolting on one side to a respective cross-support and on another side to a respective side-support.

The leveler assembly component 16 serves as the base assembly's legs to carry frame 14 and thus carry the vehicle model over the ground surface. Among other things, the assemblies put frame 14 on level so that the model can be worked on. In one sense, leveler assemblies 16 resemble wheel assemblies on production automobiles—there are four of them, two on the front of frame 14 and two on the rear. Specifically, and as shown in FIGS. 1 and 2, two leveler assemblies 16 are oppositely disposed on front frame segment 24, and two leveler assemblies 16 are oppositely disposed on rear frame segment 26. Even more specifically, the leveler assemblies are attached to side-supports 36, 38 by bolting. There, they can be adjusted along the length of the side-supports, though generally two leveler assemblies 16 are aligned opposite each other on opposite and respective side-supports such as shown in FIG. 2 on front frame segment 24 and rear frame segment 26. Referring now to FIGS. 3 and 4, each leveler assembly is made up of several parts including a base 52 that carries a jack assembly 54 and that also carries a wheel hub locator 56 with a hub 58. Collectively these parts compose the leveler assembly.

Base 52 attaches leveler assembly 16 to frame 14 and carries the other mentioned parts of the leveler assembly. The base generally resembles a "T" that is places on its side. It is one-piece and is made out of aluminum or any other suitable material. Since it carries other parts, base 52 is somewhat located at the center of leveler assembly 16. Its sideways T-shape is made from a vertical plate 60 with a horizontal plate 62 extending therefrom. Vertical plate 60 has an arrangement of locating nubs 61 (FIG. 4) that help locate the leveler assembly on the respective base assembly side-support. The locating nubs are sized to form a snug fit with holes 50, and they are arranged to complement the arrangement of holes 50. The locating nubs protrude from a surface 64 of vertical plate 60. Horizontal plate 62, on the other hand, defines several bolt holes 66 and a sleeve 68. The bolts further help locate the leveler assembly on the respective base assembly side-support. They can be arranged in a number of manners to complement the arrangement of holes 50. Sleeve 68 simply allows a part of jack assembly 54 to extend through horizontal plate 62.

Jack assembly 54 levels base assembly 10 by immobilizing it so that the automobile model on the base assembly can be worked on. All four jack assemblies (shown in FIGS. 1 and 2) perform this function together to put the base assembly on a level plane, but each jack assembly optionally works independent of the others. Jack assembly 54 is indirectly attached to base 52 through a support 70 where the assembly lies substantially inside of interior space 40. The support is attached to a bottom surface of horizontal plate 62 by bolting, and the jack assembly is attached to a bottom surface of support 70 also by bolting. Jack assembly 54 is made up of a jack 72 that is powered by a jack motor 74. The jack motor gives the jack enough power to hold the base assembly above the ground after the jack is motorized downward to engage the ground.

Referring now to FIG. 3, wheel hub locator 56 carries hub 58 and adjustably fixes the hub along a longitudinal horizontal direction, a vertical direction, and a lateral horizontal direction (shown in FIG. 3 as respective x, y, and z directions). This directional, or coordinate, system described and shown is defined with respect to vertical plate 60 and horizontal plate 62. The locator 56 can locate hub 58 by moving it in any one of the above directions independent of the other two directions. As one example, the user can move hub 58 in the vertical direction, and then in the longitudinal horizontal direction without moving it in the lateral horizontal direction at all. And once the hub has been moved in a desired location, it is fixed—that is, the hub is kept in that location until the user desires to move it to another location. All of these movement and fixing operations can be done manually by the user. The wheel hub locator is attached to base 52 through horizontal plate 62 by bolting; the locator is also attached to support 70 this way. To adjust hub 58, wheel hub locator 56 is made up of several parts including a first adjuster 76, a second adjustor 78, and a third adjustor 80.

First adjuster 76 adjustably fixes hub 58 along the longitudinal horizontal direction (x direction). It allows hub 58 to slide in that direction independent of base 52. The first adjuster includes an adjustment plate 82 with four slots 84. The adjustment plate 82 has a generally rectangular shape and is made out of tool steel or any other suitable material. As noted, plate 82 is slotted 84 in the longitudinal horizontal direction near its four corners to fit slot bolts 90. When first adjuster 76 is assembled, a pair of oppositely disposed keeper plates 86 is attached by bolting into the sides of a base plate 88. The keeper plates help hold adjustment plate 82 in place generally flush against base plate 88 and prevent plate 82 from moving in the vertical direction. The base plate is similarly shaped and made as adjustment plate 82. Adjustment plate 82 fits between keeper plates 86 for slideable movement in the slotted direction. Slot bolts 90 are slid through slots 84 and are attached into base plate 88 by bolting. The slot bolts keep adjustment plate 82 generally flush against base plate 88 but again allow it to slide in the slotted direction. When in use, the slot bolts can be loosened and tightened to respectively slide and fix adjustment plate 82 in a desired position.

Second adjuster 78, on the other hand, adjustably fixes hub 58 along the vertical direction (y direction). It allows hub 58 to slide in that direction independent of base 52. The second adjustor includes an adjustment plate 92 with four slots 94. Plate 92 is similarly shaped and made as adjustment plate 82. Adjustment plate 92 is slotted 94 in the vertical direction near its four corners to fit slot bolts 98. When second adjustor 78 is assembled, a pair of oppositely disposed keeper plates 96 is attached into the sides of adjustment plate 82 by bolting. The keeper plates help hold adjustment plate 92 in place generally flush against adjustment plate 82 and prevent plate 92 from moving in the longitudinal horizontal direction. Adjustment plate 92 fits between keeper plates 96 for slideable movement in the slotted direction. Slot bolts 98 are slid through slots 94 and are attached to adjustment plate 82 by bolting. The slot bolts keep adjustment plate 92 generally flush against adjustment plate 82 but again allow it to slide in the slotted direction. When in use, the slot bolts can be loosened and tightened to respectively slide and fix adjustment plate 92 in a desired position.

And finally for the wheel hub locator, third adjustor 80 adjustably fixes hub 58 along the lateral horizontal direction (z direction). It also allows hub 58 to slide in that direction independent of base 52. The third adjustor has parts on separate sides of base 52, and the parts on each side virtually mirror each other. Because of this mirror, only the side that is shown exploded in FIG. 3 will be described and it can be assumed that the other side is constructed and functions similarly. As shown, adjustor 80 is attached to base 52 through horizontal plate 62, and it is also attached to support 70. The third adjustor includes a base plate 100, a pair of guides 102, a jam plate 104, and a slide 106. The base plate provides a continuous surface for guides 102 and slide 106, it also prevents slide 106 from moving in the longitudinal horizontal direction. Base plate 100 is partly bolted to horizontal plate 62 and support 70. It has a rectangular shape and is made out of tool steel or any other suitable material. Attached to plate 100 is a pair of oppositely disposed guides 102. The guides provide an upper and lower guiding structure for slide 106 and they prevent slide 106 from moving in the vertical direction. They too are rectangular in shape and made and made out of tool steel or any other suitable material. The guides are attached on opposite ends of plate 100 and spaced apart in parallel. Guides 102 stretch lengthwise from one end of plate 100 to another end. The width of the space between the parallel guides is about the width of slide 106 that is fit therebetween. Attached on top of guides 102 is jam plate 104. The jam plate serves as a boundary for that side of third adjustor 80 to hold slide 106 in place and prevent it from moving in the longitudinal horizontal direction. It is rectangular in shape and made of tool steel or any other suitable material. Jam plate 104 has four aligned apertures 108 adapted to fit four respective jam nuts 110. And now, the slide is the part of the third adjuster that actually moves in the lateral horizontal direction while the other parts just described remain stationary. Slide 106 thus slides in the lateral horizontal direction and so moves hub 58 in that direction. The slide is generally rectangular and made out of tool steel or any other suitable material. Its shape is formed to provide a snug fit in the space defined by base plate 100, guides 102, and jam plate 104. At one end, slide 106 has a flanged end 112 that is constructed to attach to base plate 88.

When third adjustor 80 is assembled, base plate 100 is bolted into the side of horizontal plate 62 and is also bolted into the side of support 70. Guides 102 are bolted with their parallel spacing onto base plate 100. Jam plate 104 is then bolted onto the guides defining a space therebetween. Slide 106 is then inserted with its non-flanged end first into that space between the guides and between the base plate and the jam plate. Flanged end 112 protrudes out of that defined space and is bolted to the sides of base plate 88. When in use, slide 106 is free to move in the lateral horizontal direction when jam nuts 110 are loosened, and it is fixed in place when jam nuts 110 are tightened to engage slide 106. Hence the user can loosen the jam nuts and slide hub 58 in the lateral horizontal direction, and then tighten the jam nuts to fix the hub in a desired position.

Hub 58 is constructed out of tool steel, or any other suitable material, to carry a wheel assembly 114 (FIGS. 1 and 2). It generally lies outside of interior space 40 and specifically is attached to adjustment plate 92 by bolting. As shown in the figure, it has a square base with a circular mounting portion extending therefrom. Wheel assembly 114 is mounted on the hub mounting portion and is the part of leveler assembly 16 that contacts the ground and holds base assembly 10 above the ground when jack 72 is disengaged.

Referring now back to FIGS. 1 and 2, the coupler components 18 serve as a hitching attachment for base assembly 10. They are constructed as such to receive a hitch so that the user can tow the base assembly. The couplers are suitably designed so that base assembly 10 can be hitched both from the front and the rear. They are made out of aluminum or any other suitable material. As mentioned, one coupler 18 is attached to front frame segment 24 while another coupler 18 is attached to rear frame segment 26. Specifically, each coupler is bolted to a cross-support of its respective frame segment.

The first and second fascia components 20, 22 serve as respective front and rear extensions for base assembly 10 so that the base assembly can accommodate lengthier modeled automobiles with front and rear fascias. Each fascia is made out of parts similar to model-making components 12, but instead of extending from the top of frame 14, fascias 20, 22 extend from front and rear sides of the frame. Specifically, first fascia 20 is removably attached to the ends of side-supports of front frame segment 24 by bolting, and second fascia 22 is at least partly removably attached to the side-supports of rear frame segment 26 by bolting.

Referring now to FIGS. 5 and 6, another embodiment of a modular base assembly is shown at 200. This base assembly can also support different size automobile models. And although not shown, numerous model-making components can be attached to it to form the skeleton of such an automobile model. Base assembly 200 has a motorized vehicle undercarriage 202 that drives a frame 204. Collectively these components compose modular base assembly 200.

The vehicle undercarriage component 202 carries frame 204 and drives base assembly 200. The undercarriage drives similar to a real production automobile in the sense that it can move on wheels, can steer, can brake, and the like. Undercarriage 202 generally lies below frame 204 where it can, but need not be attached to the frame. The vehicle undercarriage has a vehicle frame 206 that carries a drive assembly 208, a steer assembly 210, a brake assembly 212, four wheel assemblies 214, and four jack assemblies 216. All of these assemblies are electrically controlled, and can be remotely controlled. Because only minimal operation is required, a battery can power each assembly. As mentioned, most of these assemblies make base assembly 200 similar to a production automobile, and as such other suitable assemblies besides those described that perform similar functions will suffice. The vehicle frame serves as an attachment structure for the other assemblies and is sturdy enough to support the automobile model that is placed on base assembly 200. The drive assembly drives base assembly 200 in a suitable way. It has a drive motor 218 that runs a drive shaft 220. The drive shaft has a main section that is connected to a front and rear section through differentials 222. The steer assembly steers base assembly 200 also in a suitable way. This assembly has a motor (not shown) that operates steering arm 224. The brake assembly brakes base assembly 200 in a suitable way. It is attached to vehicle undercarriage 202 adjacent wheel assembly 214. It too has a motor that operates the brakes (neither shown). The wheel assembly provides wheels 226 that are driven on the ground. The wheels are attached to vehicle frame 206 through rims 228. Lastly, the jack assemblies level base assembly 200 by immobilizing it so that the automobile model on the base assembly can be worked on. All four jack assemblies perform this function together to put the base assembly on a level plane, but each jack assembly optionally works independent of the others. A suitable jack assembly can be used. Each jack assembly 216 is placed adjacent to a respective wheel assembly 214 and is attached to vehicle frame 206 thereat. Each one has a jack 230 that is powered by a jack motor 232. The jack motor gives the jack enough power to hold the base assembly above the ground after the jack is motorized downward to engage the ground.

Referring now to FIG. 5, the frame component 204 serves as base assembly's 200 shell that sits on top of and substantially covers undercarriage 202. This is where the model-making components stem from to form a skeleton of an automobile model. Frame 204 generally has a rectangular shape with a closed top and an open bottom. And although not shown, its top could include a service access opening to expose parts of undercarriage 202 so that the parts could be serviced. The frame could be attached to the undercarriage but otherwise can be lifted off of it. The frame is generally an integral structure made up of several parts including a platform 234, four pairs of side-supports 236 extending from the bottom surface of the platform, four bottom covers 238 partly covering the side-supports, and numerous reinforcements 240 disposed between the platform and the bottom covers.

Platform 234 is the top of frame 204. It generally has a rectangular shape and is made out of aluminum or any other suitable material. It lies on top of undercarriage 202 and virtually covers all of it except wheel assemblies 214. Platform 234 has a top surface 242 that defines a plurality of holes 244 in the form of a matrix. The holes are disposed on all of top surface 242 and they are arranged in such a way so that model-making components can be attached anywhere therealong. This partly gives base assembly 200 its modularity. Put differently, holes 244 are actually bolt holes suitable for attaching model-making components. The components can be attached and unattached essentially anywhere along the hole matrix to thereby create modeled vehicles of different configurations. Holes 244 are machined completely through top surface 242 to the bottom surface of platform 234. And although shown covering virtually all of top surface 242, the holes could be arranged in many forms so long as the model-making components can be attached and unattached thereto.

Side-supports 236 are positioned along platforms 234 boundary and are the sides of frame 204. There are four of them that substantially define that boundary. Each one has a general rectangular shape and is made out of aluminum or any other suitable material. Each side-support extends perpendicularly down from the bottom surface of platform 234. Each one is attached by bolting to the bottom surface of platform 234. Here too, each side-support 236 has surfaces that define a plurality of holes 246 in the form of a matrix. These holes are again arranged so that model-making components can be attached and unattached anywhere therealong. This gives base assembly 200 some of its modularity. Holes 246 are actually bolt holes machined on all of side-supports' 236 surfaces.

Referring now to FIGS. 5 and 6, bottom covers 238 form the open bottom of frame 204. The bottom covers help provide a snug fit between vehicle frame 206 and vehicle undercarriage 202. Each one is generally rectangular in shape and is made out of aluminum or any other suitable material. They are disposed adjacent side-supports 236 and each one extends perpendicularly from a respective side-support 236 and to and almost touching vehicle undercarriage 202. Each bottom cover 238 is attached to a respective side-support 236 by bolting.

And finally, referring now to FIG. 5, reinforcements 240 help support bottom covers 238. They generally have a cylindrical shape and are made out of aluminum or any other suitable material. Numerous reinforcements 240 are disposed underneath each bottom cover 238 where they extend from the platform bottom surface and to the respective bottom cover.

Variations and modifications are possible without departing from the scope and spirit of the present invention as defined by the appended claims.

The embodiments in which an exclusive property or privilege is claimed are defined as follows:

1. A modular base assembly used in vehicle model-making, said base assembly comprising:
   a frame comprised of at least one frame segment, said frame segment having at least one cross-support supporting at least two oppositely disposed side-supports, each of said side-supports having a surface defining a plurality of holes for removably attaching model-making components thereto; and
   at least two leveler assemblies that level the base assembly and that are oppositely disposed on said respective two side-supports and removably attached thereto; wherein said frame is comprised of a plurality of frame segments attached end-to-end to form a rectangular shape, said segments being attached in such a way to constitute a front and rear frame segment with at least intermediate frame segment therebetween.

2. A base assembly as defined in claim 1 wherein said at least one frame segment is rectangular in shape having sides comprised of first and second oppositely disposed cross-supports, and first and second oppositely disposed side-supports that are attached to said cross-supports, said sides defining an interior space of said at least one frame segment.

3. A base assembly as defined in claim 2 wherein said first and second cross-supports each have a center section with opposite ends that are attached to said respective first and second side-supports, and wherein said ends each have an extending end flange attached to the underside of said respective first and second side-supports.

4. A base assembly as defined in claim 2 where said at least one frame segment has four interior angle brackets to further maintain the structure of said at least one frame segment, said angle brackets being located within said interior space and each being attached at centered corners of said at least one frame segment where said respective side-supports and cross-supports meet.

5. A base assembly as defined in claim 2 wherein said at least two leveler assemblies each have a hub lying outside of said interior space, and each of said hubs having a wheel assembly mounted thereto.

6. A base assembly as defined in claim 5 wherein said at least two leveler assemblies each have hub locator that adjustably fixes said respective hub along a longitudinal horizontal, a vertical, and a lateral horizontal direction.

7. A base assembly as defined in claim 6 wherein each of said wheel hub locators have a first, second and third adjuster that adjustably fix said respective hub along the respective longitudinal horizontal, vertical and lateral horizontal directions.

8. A base assembly as defined in claim 1 comprising four leveler assemblies, two of said leveler assemblies oppositely disposed on said respective side-supports of said front frame segment, and the other two of said leveler assemblies oppositely disposed on said respective side-supports of said rear frame segment.

9. A base assembly as defined in claim 1 wherein said plurality of holes are disposed on all of said side-supports' surfaces in the form of a matrix so that said model-making components can be removably and adjustably attached to said side-supports along said plurality of holes.

10. A base assembly as defined in claim 9 wherein said at least two leveler assemblies can also be removably and adjustably attached to said side-supports along said plurality of holes.

11. A base as defined in claim 1 further comprising:
   a pair of couplers constructed to receive a hitch, one of said couplers being attached to said front frame segment, and the other of said couplers being attached to said rear frame segment.

12. A base assembly as defined in claim 1 further comprising:
   a first fascia extension that extends the length of said frame and that is removable attached to one of said front frame segment and said rear frame segment.

13. A base assembly as defined in claim 12 further comprising:
   a second fascia extension removably attached to the other of said front frame segment and said rear frame segment.

14. A base assembly as defined in claim 1 wherein said at least one cross-support comprises a generally rectangular aluminum cast body having a first and second end and a center section therebetween, both of said ends having oppositely disposed end flanges constructed to carry one of said side-supports, said center section having a suitable webbing giving sufficient strength to said at least one cross-support to help support a vehicle model.

15. A base assembly as defined in claim 1, further comprising:
   an interior angle bracket including a generally asymmetrical triangular cast aluminum body having three connected sides, each side having a suitable webbing throughout giving sufficient strength to the bracket to help support a vehicle model,
   wherein the bracket is constructed to be secured to an inside corner of a said frame segment.

16. A modular base assembly used in vehicle model-making, said base assembly comprising:
   a frame comprised of at least one frame segment, said frame segment having at least one cross-support supporting at least two oppositely disposed side-supports, each of said side-supports having a surface defining a plurality of holes for removably attaching model-making components thereto; and at least two leveler assemblies that level the base assembly and that are oppositely disposed on said respective two side-supports and removably attached thereto; wherein said at least two leveler assemblies each have a motor-powered jack assembly lying substantially inside of said interior space.

17. A base assembly as defined in claim 16, a first leveler assembly of said at least two leveler assemblies comprising:

a base that attaches the first leveler assembly to the base assembly; wherein said motor-powered jack assembly of said first leveler is attached to said base and has a jack powered by a jack motor;

a wheel hub locator attached to said base that adjustably fixes a hub along a longitudinal horizontal direction, a vertical direction, and a lateral horizontal direction all with respect to said base; and said hub constructed to carry a wheel assembly that is attached to the end of said wheel hub locator.

18. A base assembly as defined in claim 17 wherein said base has a T-shape with a vertical and horizontal plate, said horizontal plate defining a sleeve where part of said jack extends therethrough, said base also having an arrangement of locating nubs protruding from said base's surface and that locate the first leveler assembly on the base assembly.

19. A base assembly as defined in claim 17 wherein said wheel hub locator includes a first adjuster that adjustably fixes said hub along the longitudinal horizontal direction, and that includes an adjustment plate defining at least two slots adapted to fit slot bolts.

20. A base assembly as defined in claim 19 wherein said wheel hub locator includes a second adjuster that adjustably fixes said hub along the vertical direction, and that includes an adjustment plate defining at least two slots adapted to fit slot bolts.

21. A base assembly as defined in claim 20 wherein said wheel hub locator includes a third adjuster that adjustably fixes said hub along the lateral horizontal direction, and that includes a base plate attached to said base, a pair of parallel spaced guides attached to said base plate, a jam plate attached over said guides defining at least one aperture adapted to fit a jam nut, and a slide fit between said guides that slides along the longitudinal horizontal direction when said jam nut is loosened and that is fixed along the lateral horizontal direction when said jam nut is tightened.

22. A base assembly as defined in claim 16 wherein said at least one frame segment is rectangular in shape having sides comprised of first and second oppositely disposed cross-supports, and first and second oppositely disposed side-supports that are attached to said cross-supports, said sides defining an interior space of said at least one frame segment.

23. A modular base assembly used in vehicle model-making, said base assembly comprising:

a motorized vehicle undercarriage; and a frame carried by said undercarriage, said frame being comprised of a platform having a top surface that generally lies over said undercarriage, said top surface partly defining a plurality of holes in the form of a matrix so that model-making components can be removably attached to said platform; wherein said undercarriage comprises a vehicle frame that attaches a drive assembly that drives that base assembly, a steer assembly that steers the base assembly, a brake assembly that brakes the base assembly, a wheel assembly, and at least two motor-powered jack assemblies that level the base assembly.

24. A modular base assembly used in vehicle model-making, said base assembly comprising:

a motorized vehicle undercarriage; and a frame carried by said undercarriage, said frame being comprised of a platform having a top surface that generally lies over said undercarriage, said top surface partly defining a plurality of holes in the form of a matrix so that model-making components can be removably attached to said platform; wherein said platform is substantially rectangular in shape and removably lies on top of said undercarriage so as to substantially cover said undercarriage and wherein said plurality of holes are disposed on all of said platform's top surface in the form of a matrix so that said model-making components can be removably attached to said platform.

25. A modular base assembly used in vehicle model-making, said base assembly comprising:

a motorized vehicle undercarriage; and a frame carried by said undercarriage, said frame being comprised of a platform having a top surface that generally lies over said undercarriage, said top surface partly defining a plurality of holes in the form of a matrix so that model-making components can be removably attached to said platform; wherein said frame is substantially rectangular in shape and further comprises four side-supports positioned along said platform's boundary and that extend from the bottom surface of said platform and wherein each of said four side-supports has a surface defining a plurality of holes in the form of a matrix disposed on all of said surface so that model-making components can be removably attached thereto.

26. A base assembly as defined in claim 25 wherein said frame further comprises four bottom covers that further provide a fit between said frame and said undercarriage, each attached to said respective four side-supports.

27. A base assembly as defined in claim 26 wherein said frame further comprises at least one reinforcement supporting each of said bottom covers, said at least one reinforcement extending from said platform bottom surface and to said respective bottom cover.

28. A pair of side-supports used in a vehicle model-making modular base assembly, each side-support comprising:

an extruded rectangular body having first and second ends and four surfaces extending therebetween, said surfaces defining a plurality of holes in the form of a matrix for removably attaching model-making components thereto, said matrix substantially covering said surfaces, wherein the pair of side-supports are disposed in a stacked relationship.

29. A pair of side-supports as defined in claim 28, wherein each side-support is extruded from aluminum to a width of 160 mm, a height of 120 mm, and a length of 1,000 mm.

* * * * *